March 31, 1970     J. E. GREEVER     3,503,631
BRAZED JOINTS
Filed Nov. 1, 1968
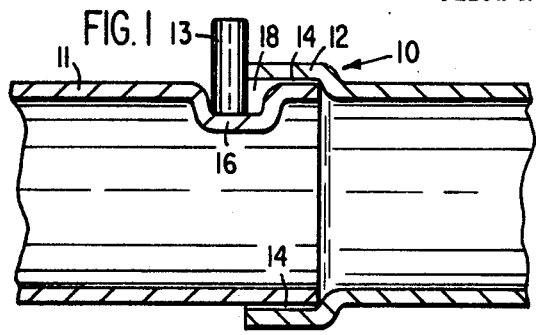
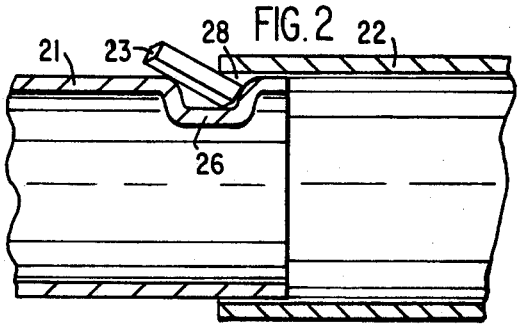
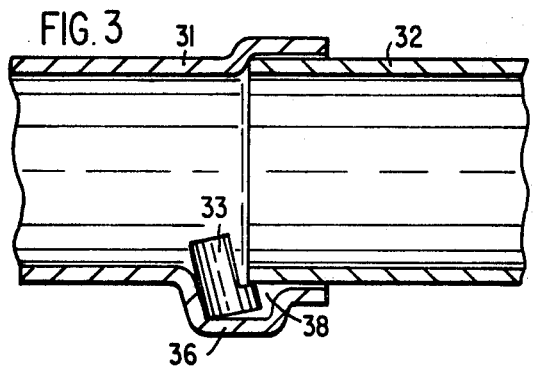
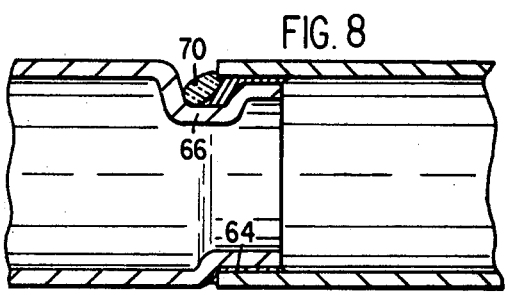
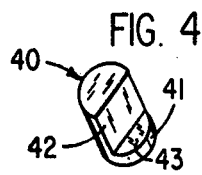
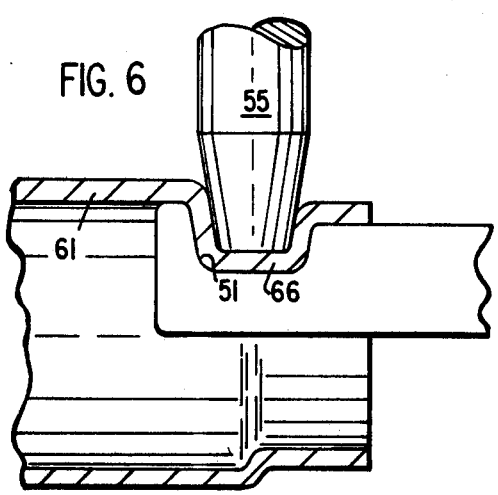
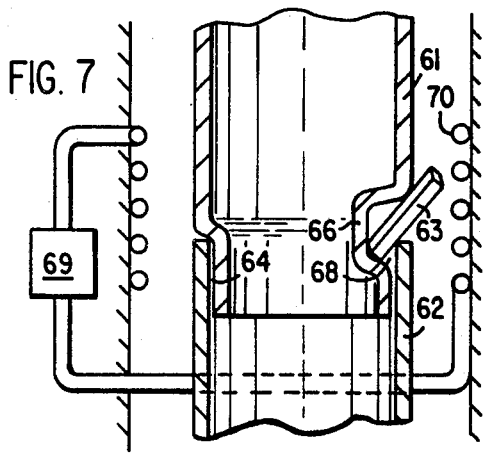
INVENTOR.
JAMES E. GREEVER.
BY
Frank N. Decker Jr.
ATTORNEY.

United States Patent Office

3,503,631
Patented Mar. 31, 1970

3,503,631
BRAZED JOINTS
James E. Greever, Dewitt, N.Y., assignor to Carrier Corporation, Syracuse, N.Y., a corporation of Delaware
Filed No. 1, 1968, Ser. No. 772,785
Int. Cl. F16l *13/02, 35/00, 47/02, 55/00;* B23k *35/02*
U.S. Cl. 285—21                                                14 Claims

ABSTRACT OF THE DISCLOSURE

A method for making a brazed joint and a joint assembly between a pair of telescoped metal members. A dimple is formed in one of the members for receiving a brazing preform comprising brazing metal suspended in a glass matrix. The other of the members is telescoped over the first member to form a capillary space between the members and overlaps the dimple in the first member slightly to form a recess portion in the dimple. A brazing preform is inserted in the dimple and preferably extends into the recess portion thereof. Heat is applied to the joint assembly to melt and release the brazing metal from the preform. During this process the molten glass forms a protective layer over the molten brazing metal in the recess between the members to inhibit oxidation while the brazing alloy flows out of the recess into the capillary space between the members. The brazing preform may have a foot of enlarged dimension to assist in holding it in the recess.

BACKGROUND OF THE INVENTION

In order to obtain a satisfactorily brazed joint it is necessary to flow brazing metal into a region between members being joined. Since brazing metal alloys are frequently relatively expensive, it is also desirable to limit the amount of alloy consumed in the brazing operation. The use of brazing preforms cast in a shape congruent to the shape to be formed and having a fixed amount of brazing alloy metal therein is well known. However, many desirable brazing alloys are too brittle to be cast into a sufficiently rigid shape to be satisfactorily employed as brazing rings. The problem of brittleness may be partially overcome by increasing the cross-sectional area of the preform but this increases the amount of metal required which in turn results in an uneconomical process. Furthermore, the use of brazing rings generally requires a separate shape for each different size and shape of joint being formed. Paste and slurries of brazing metal can be used in some applications, but it is difficult to accurately control the amount of material used in mass production brazing. Also, splattering or running of the paste or slurry may result in an unsatisfactory joint. It is known to form ductile brazing metals into a wire which can be bent and positioned around the joint to be formed. However, many brazing alloys are too brittle to be formed into wire or to be bent in use. This problem has been partially overcome by alloying the brazing material with a material, such as silver, to impart ductility, but cost considerations prohibit use of silver in many instances.

Accordingly, it is a principal feature of this invention to provide a brazing technique including a brazing preform and a joint assembly which can satisfactorily utilize a wide variety of brazing alloy compositions irrespective of their ductility, and wherein the brazing preform may assume a simple shape which is suitable for brazing a number of different sizes and shapes of joints.

SUMMARY OF THE INVENTION

A first metal tubular member to be brazed is formed with a dimple in one end adjacent to and spaced from the edge of the member to be brazed. A second metal tubular member is telescopically engaged with the first metal member in overlapping relation thereto and slightly overlapping the dimple to form a recess between the members in the cavity formed by the dimple. A suitably shaped brazing preform comprising metal powder suspended in a glass matrix is located in the dimple and preferably in the recess formed in the dimple between the members. The brazing preform may be formed with a foot of enlarged transverse dimension joined to a body by a shoulder which serves to hook the preform into the recess and the dimple.

The joint assembly is heated above the softening point of the glass and above the liquidus temperature of the brazing metal suspended therein. The brazing metal runs through the recess into a capillary space between the telescoped members being joined. The molten glass overlies the brazing alloy in the recess to protect the molten metal from ambient atmosphere during the period of time the metal is flowing into the capillary space. The assembly is thereafter cooled which solidifies both the brazing metal in the capillary space and the glass in the dimple.

BRIEF DESCRIPTION OF THE DRAWINGS

FIGURE 1 is a cross-sectional view through a joint assembly prior to brazing illustrating one form of brazing preform disposed in a dimple between telescoped members in accordance with this invention;

FIGURE 2 illustrates a joint assembly utilizing slightly modified joint members and a modified brazing preform;

FIGURE 3 illustrates a further modified pair of joint members and a modified brazing preform;

FIGURE 4 illustrates a brazing preform having a foot portion thereon;

FIGURE 5 illustrates a modified brazing preform having a foot portion thereon;

FIGURES 6 and 7 illustrate steps in forming a brazed joint in accordance with this invention; and FIGURE 8 illustrates a completed brazed joint made in accordance with this invention.

DESCRIPTION OF THE PREFERRED EMBODIMENTS

Referring particularly to FIGURE 1, there is illustrated a joint assembly 10 comprising a first tubular metal spigot member 11 and a second tubular metal bell member 12. Members 11 and 12 are telescopically engaged and overlap each other to provide an annular capillary space 14 therebetween, preferably having a radial extent of less than about ten one-thousandths of an inch. First member 11 has a dimple 16 formed therein into which a brazing preform 13 may be inserted. Dimple 16 is preferably circular in plan view, although polygonal shapes are feasible. Dimple 16 is preferably disposed adjacent an end of first member 11 and spaced from the end of the member by a distance at least five times the thickness of the wall member in order to provide a satisfactory overlapping area of contact between the members.

Brazing preform 13 illustrated in this figure may be rod shaped and comprises a finely divided unsintered brazing metal powder suspended in an inorganic fixed glass matrix. The preform may be made by the process described in Stenerson Patent 3,390,986 granted July 2, 1968 to which reference is made for details of a suitable preform and method of making it.

Second member 12 is telescoped over first member 11 to an extent sufficient to partially cover the top of dimple 16 thereby forming a recess portion 18 between the end portion of member 12 and the wall of dimple 16. Recess 18 is a region in the dimple which is in direct communication with the capillary space 14 formed between the members.

Joint assembly 10 is substantially heated by some suitable means, such as in an electric furnace, a brazing torch or a radio frequency generator, to heat the joint members and the preform. The brazing preform is heated above the softening point of the glass component thereof and above the liquidus temperature of the brazing metal in the preform. The assembly may be positioned axially horizontally, as shown in FIGURE 1, with the dimple at the top of the assembly facing upwardly. As the preform begins to melt, the molten brazing metal drops to the bottom of the dimple and passes by capillarity through recess 18 into capillary space 14 between the members. The molten glass floats on the top of the brazing metal in the dimple to prevent oxidation thereof by the ambient atmosphere. The assembly is heated sufficiently long to cause the molten brazing metal to flow into and completely fill annular capillary space 14. Thereafter, the assembly is cooled to solidify the adhering brazing alloy and the molten glass.

FIGURE 2 illustrates a slightly modified form of the invention, wherein the tubular members 21 and 22 to be joined are of different diameter so that it is unnecessary to specially shape the ends of the tubes. A dimple 26 is formed adjacent the end of the first member 21 and second member 22 is telescoped over the first member and overlaps a portion of dimple 26 to form a recess 28 therebetween. Brazing preform 23, illustrated in this embodiment, may be a rod of square or rectangular cross-section which is directly inserted into recess portion 28 of dimple 26. In this embodiment of the invention, brazing preform 23 will remain in recess 28 whether the joint assembly is in a horizontal position, as shown, or is rotated clockwise into a vertical position so that the recess opens upwardly prior to heating in either position.

FIGURE 3 illustrates a further modification of the invention wherein the tubular members 31 and 32 are of the same diameter and the bell member is internally dimpled. First member 31 has dimple 36 by deforming metal away from the surface of the tube in a radially outward direction and second member 32 is telescopically engaged therewith. Member 32 overlaps dimple 36 sufficiently to form a recess 38 on the inside of dimple 36. Brazing preform 33, illustrated in this embodiment, is of a modified shape having an enlarged foot portion to assist in retaining it in the dimple prior to brazing.

FIGURE 4 illustrates a cylindrical rod shaped brazing preform 40 having an enlarged foot portion 41 of greater transverse dimension than body portion 42. Body portion 42 meets foot 41 at a shoulder 43. Shoulder 43 may be conveniently hooked under the edge of second joint member of any of the embodiments by rotating the preform so as to assist in retaining the brazing preform in loose engagement in the recess portion of the dimple during manipulation of the joint assembly.

FIGURE 5 illustrates a further modified brazing preform 45 of generally triangular rod shape. Foot portion 46 is of triangular cross-section and body portion 47 is of trapezoidal cross-section. The foot and body sections meet each other in a shoulder 48 which is adapted to be hooked over the edge of the first member of the joint assembly by rotating the preform to assist in retaining the preform in position.

FIGURE 6 illustrates a first step in forming the joint assembly in accordance with this invention. A suitable female die member 50 having a recess 51 therein is positioned adjacent a surface of the tube to be dimpled. Recess 51 conforms generally to the shape of the desired dimple and die member 50 conforms to the shape of the tube at the location to be dimpled. A male die member 55 is compressed into the recess in female die member 50 to deform the metal wall of first joint member 61 to form a dimple of desired shape.

After first member 61 has been dimpled, second member 62 is telescopically engaged therewith in overlapping relation, as shown in FIGURE 7, forming an annular capillary space 64 between the members to be joined. Second member 62 overlaps the edge of dimple 66 sufficiently to form a recess portion 68 in the dimple between the members. A suitable brazing preform rod 63 is inserted in dimple 66 and preferably extends directly into recess 68. The joint assembly is then placed in either a vertical position, as shown in FIGURE 7, or a horizontal position, as shown in FIGURE 1. The assembly is then heated by a suitable means, such as a radio frequency generator 69 having induction coil 70 surrounding the joint assembly, for a length of time sufficient to melt and release the brazing alloy from the glass matrix as previously explained, and to flow the brazing alloy into capillary space 64. Heat is then discontinued and the joint cooled to solidify the brazing alloy to form the completed joint.

In the finished joint, illustrated in FIGURE 8, it will be seen that the annular space 64 is filled with solidified brazing metal. The molten glass which protected the brazing alloy from oxidation during the joint forming process, has solidified to form a bead 70 in dimple 66.

By the process of this invention, various shapes and sizes of joints may be made by utilizing uniformly shaped brazing preforms, thereby avoiding the necessity of altering the shape of the brazing preform to suit the joint being made. If the joint is of such size that a single brazing preform does not flow evenly into the capillary space between the telescoped members, two or more dimples may be formed circumferentially about the first member and the brazing operation conducted in a vertical position. It has been found that a brazing preform having substantial length will flow smoothly into the dimpled recess during heating in a vertical position, even though a major fraction of the preform is initially located outside of the dimple prior to heating. It will also be seen that various joint configurations may be satisfactorily formed between tubular members of various cross-sectional shapes, including flanged plates and sputs by the means of this invention. The invention is particularly useful in brazing tank joints and the brazing preform may be located either internally or externally of the article being manufactured. The brazing preform permits the use of various alloys, such as phosphorous and copper, in proportions which provide desirable low temperature melting properties but which heretofore have been impractical, because of their lack of ductility. Likewise, alloys which are extremely susceptible to oxidation may be employed, because the molten glass layer formed protects them from ambient atmosphere during the process of melting and capillary flow. In addition, joints may be made in accordance with this invention in various positions which enables them to be used to form in situ joints where previously welding or a more expensive brazing technique was necessary.

While preferred embodiments of this invention have been described for purposes of illustration, it will be appreciated that the invention may otherwise be embodied.

I claim:
1. A method of making a brazed joint between two tubular metal joint members which comprises the steps of:
   (A) forming a dimple in one of said members adjacent to and spaced from an edge of said member;
   (B) telescoping said tubular metal members together and overlapping them to an extent that the other of in an inorganic fused glass matrix, in said dimple; in said one member, thereby forming a recess portion in said dimple for receiving molten brazing metal and a capillary space between the overlapped members communicating with said recess;
   (C) inserting a brazing preform, comprising a shaped aggregate having a brading metal powder suspended in an inorganic fused glass matrix,, in said dimple;
   (D) heating the metal members and the inserted brazing preform to a temperature above the softening point of the glass and above the liquidus temperature of the brazing metal, thereby forming a molten glass coating over the surface of a molten pool of brazing metal in the recess in said dimple;

(E) continuing heating of said members for a time sufficient for flowing the molten brazing metal from the recess into the capillary space between the overlapping faces of said members; and (F) cooling the joint members below the solidus temperature of the brazing metal to form a brazed metal joint.

2. A method of making a brazed metal joint as defined in claim 1 including the step of positioning the telescoped tubular joint members in a generally axially vertical direction with said recess being located downwardly from the top of said dimple, thereby forming an upwardly open recess for the brazing preform and for containing molten glass and brazing metal.

3. A metod of making a brazed joint as defined in claim 1 including the step of positioning the telescoped tubular joint members in a generally axially horizontal position; and positioning the dimple in a vertically upward direction for containing molten glass and brazing metal upon heating of said members and said preform.

4. A method of making a brazed joint as defined in claim 1 wherein the step of inserting a brazing preform in said dimple includes positioning at least a portion of said preform in the recess formed in said dimple by the overlapping of said members.

5. A method of making a brazed joint as defined in claim 1 wherein the step of inserting a brazing preform in said dimple includes positioning a foot portion of a brazing preform having an enlarged foot in said recess in the dimple, said step of positioning the preform including rotating and hooking the foot of said preform in said recess with the body of said preform extending out of said dimple.

6. A joint assembly between a pair of tubular metal members; one of said tubular members having a dimple therein spaced from the end of said member; the other of said members being telescopically engaged with said one member and forming a capillary space therebetween; said other member overlapping said one member to an extent that said one member overlaps only a portion of said dimple, thereby forming a recess portion in said dimple between the members for containing molten brazing metal during the brazing process, said recess communicating with the capillary space between the members; and a brazing preform disposed in said dimple, said brazing preform comprising a shaped aggregate having brazing metal powder suspended in an inorganic fused glass matrix; said brazing metal having a liquidus temperature above the softening point of said glass, whereby said assembly may be heated to melt the glass and release melted brazing metal therefrom forming a molten glass coating over the molten brazing metal in the recess to protect the metal from ambient atmosphere while the brazing metal flows by capillarity through the capillary space between the members to form a brazed joint.

7. A joint assembly as defined in claim 6 wherein at least a portion of said brazing preform is disposed in the recess portion of the dimple formed between said members.

8. A joint assembly as defined in claim 6 wherein said brazing preform comprises a rod shaped preform, said rod shaped preform having a foot portion adjacent an end thereof which is of transversely greater size than at least a portion of the body of said rod; said foot portion of said preform and said end portion meeting each other to form a transverse shoulder, said shoulder being hooked under an edge of said other member with said foot portion disposed in the recess formed between said members.

9. A joint assembly as defined in claim 6 wherein the dimple in said one member is disposed inwardly of the end of said one member a distance of at least above five times the wall thickness of said one member.

10. A joint assembly as defined in claim 6 wherein said members are telescopically assembled with each other to form a joint having a radial clearance of less than about ten one thousandths of an inch.

11. A brazing preform comprising a rod shaped aggregate having brazing metal powder suspended in an inorganic fused glass matrix; said brazing metal having a liquidus temperature above the softening point of said glass; said rod shaped preform having a foot portion adjacent an end thereof which is of transversely greater size than at least a portion of the body of said rod; said foot portion of said preform and said end portion meeting each other to form a transverse shoulder having an extent sufficient to hook the foot portion of said preform in a recess formed between two telescoped members when one of the members has a dimple therein which is partially overlapped by the other of said members.

12. A brazing preform as defined in claim 11 wherein the body of said rod is trapezoidal in cross-section and the foot of said rod is triangular in cross-section.

13. A brazing preform as defined in claim 11 wherein the body of said rod is semi-circular in cross-section and the foot of said rod is a segment of a circle in cross-section.

14. A joint between metal members comprising:
(A) a first tubular member having a dimple formed therein;
(B) a second tubular member telescopically engaged with said first tubular member in overlapping relation therewith, said second tubular member having an end partially overlapping said dimple and forming therewith a recess between a portion of the wall of the end of said second member and the wall of said dimple;
(C) a layer of solidified brazing metal disposed in a capillary space between said overlapping members and adhering thereto; and
(D) a layer of solidified fused glass disposed in said recess sealing the capillary space between said members from ambient atmosphere, said glass remaining from the release of brazing metal from a preform into a capillary space between the overlapping joint members.

References Cited

UNITED STATES PATENTS

| | | | |
|---|---|---|---|
| 2,132,575 | 10/1938 | Moise | 285—286 |
| 2,460,667 | 2/1944 | Wurzburger | 285—287 X |
| 2,661,282 | 12/1953 | Daley | 228—56 X |
| 3,350,179 | 10/1967 | Stenerson | 29—501 X |

FOREIGN PATENTS 813,081  2/1937  France.

DAVID J. WILLIAMOWSKY, Primary Examiner

D. W. AROLA, Assistant Examiner

U.S. Cl. X.R.

29—483, 501; 228—56; 285—286

UNITED STATES PATENT OFFICE
CERTIFICATE OF CORRECTION

Patent No. 3,503,631          Dated March 31, 1970

Inventor(s) JAMES E. GREEVER

It is certified that error appears in the above-identified patent and that said Letters Patent are hereby corrected as shown below:

Column 3, line 1, for "substantially" read --subsequently--.

Column 4, line 65, for "in an organic fused glass matrix, in said dimple;" read --said member overlaps only a portion of the dimple--.

Column 4, line 71, for "brading" read --brazing--.

Signed and sealed this 23rd day of March 1971.

(SEAL)
Attest:

EDWARD M. FLETCHER, JR.          WILLIAM E. SCHUYLER, JR.
Attesting Officer                Commissioner of Patents